June 26, 1962 H. W. HULTS 3,041,430
ELECTRIC SWITCHES

Original Filed March 21, 1957 6 Sheets-Sheet 1

INVENTOR.
HAROLD W. HULTS
BY
ATTORNEY

June 26, 1962  H. W. HULTS  3,041,430
ELECTRIC SWITCHES
Original Filed March 21, 1957  6 Sheets-Sheet 2

INVENTOR.
HAROLD W. HULTS
BY
Wm. A. Auter
ATTORNEY

June 26, 1962 — H. W. HULTS — 3,041,430
ELECTRIC SWITCHES
Original Filed March 21, 1957 — 6 Sheets-Sheet 3

INVENTOR.
HAROLD W. HULTS
BY
ATTORNEY

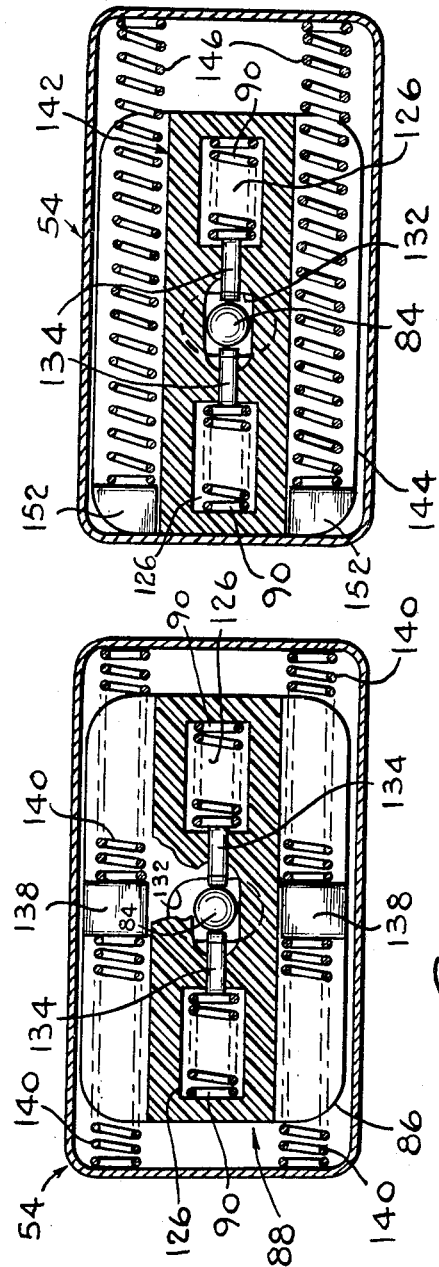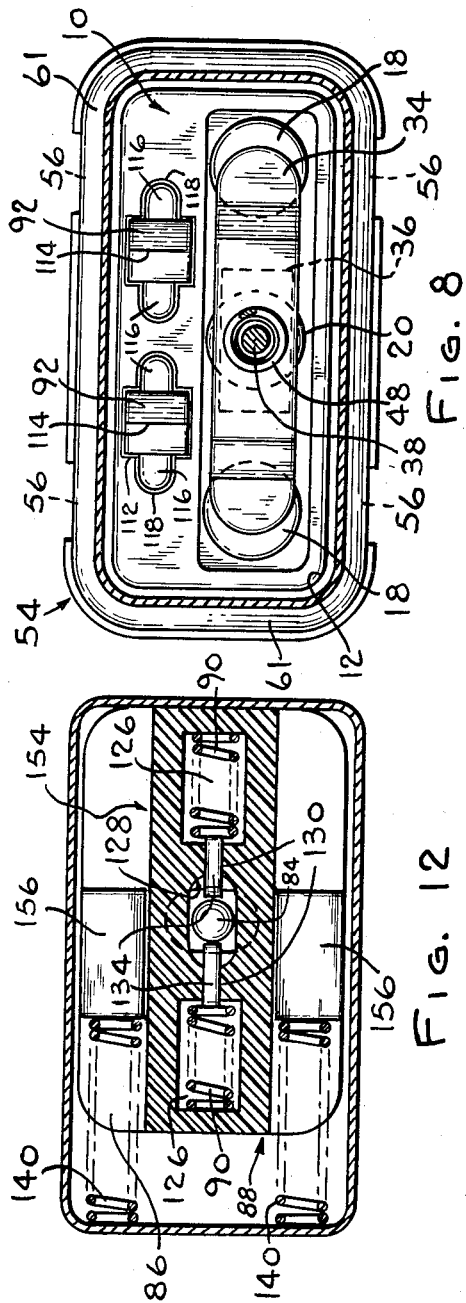

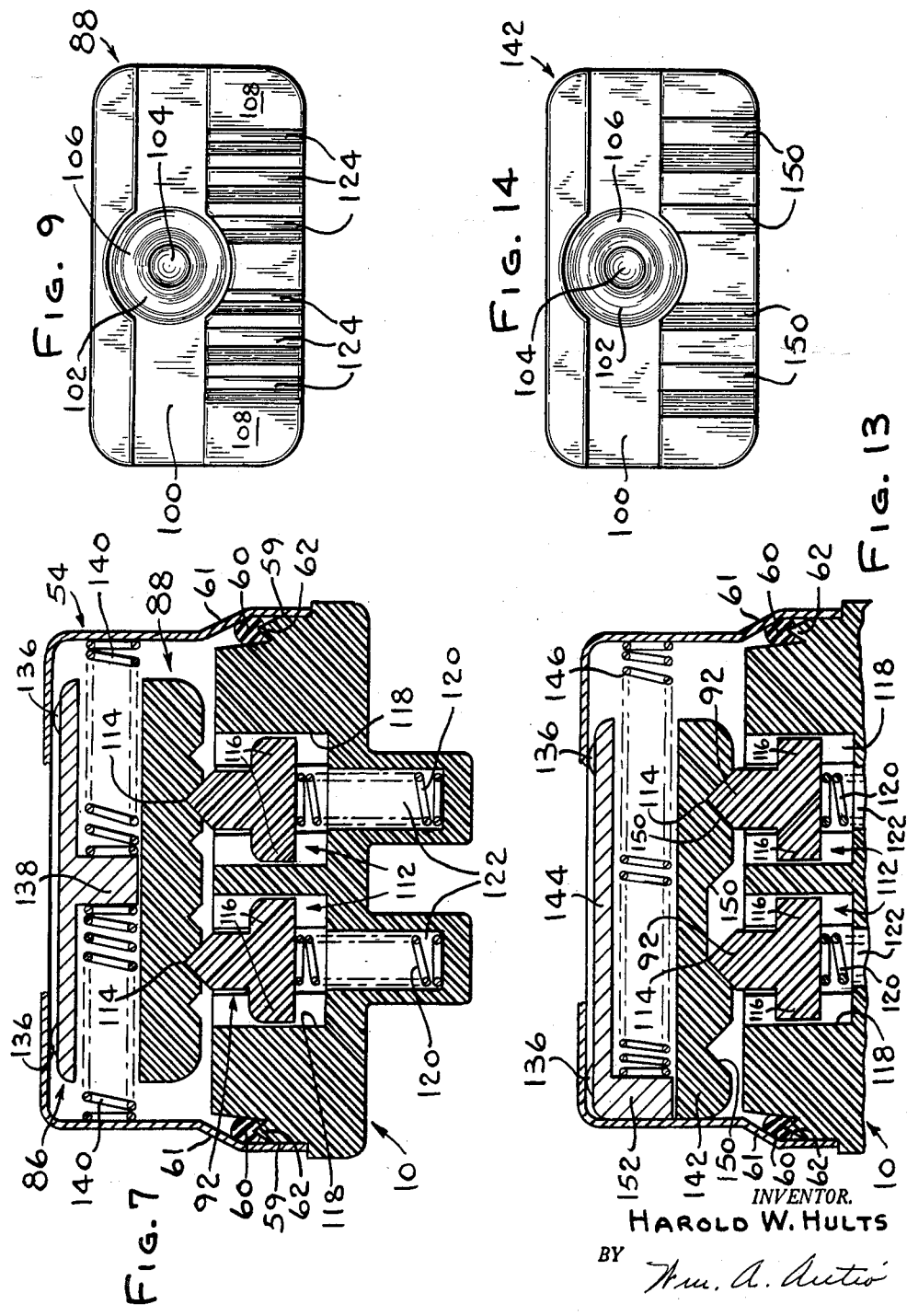

June 26, 1962 H. W. HULTS 3,041,430
ELECTRIC SWITCHES
Original Filed March 21, 1957 6 Sheets-Sheet 6
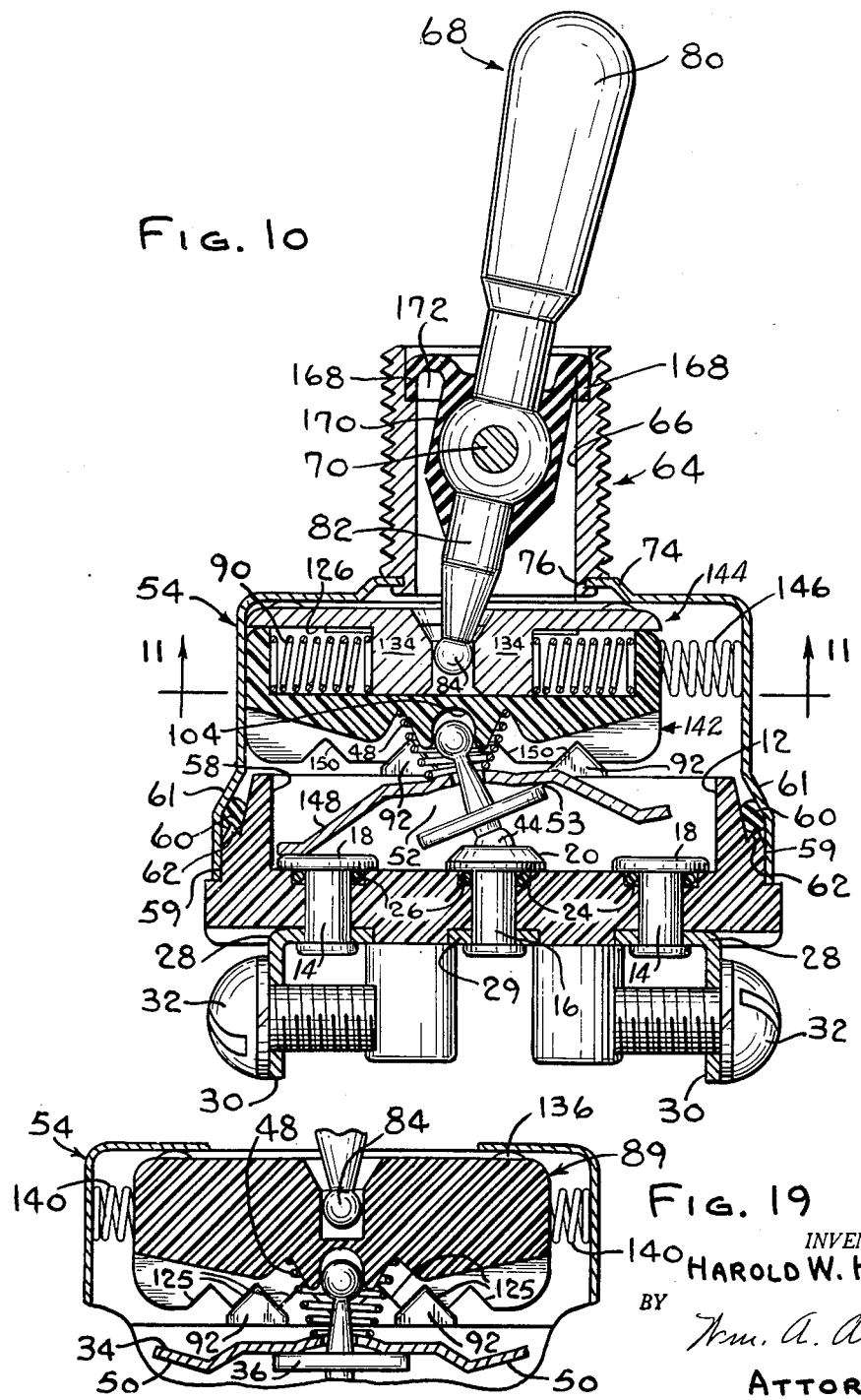
INVENTOR.
HAROLD W. HULTS
BY
Wm. A. Autio
ATTORNEY

United States Patent Office 3,041,430
Patented June 26, 1962

3,041,430
ELECTRIC SWITCHES
Harold W. Hults, Milwaukee, Wis., assignor to Cutler-Hammer, Inc., Milwaukee, Wis., a corporation of Delaware
Original application Mar. 21, 1957, Ser. No. 647,518. Divided and this application Dec. 29, 1959, Ser. No. 862,614
6 Claims. (Cl. 200—168)

This invention relates to improvements in electric switches and, although not limited thereto, the invention relates more particularly to relatively high capacity switches of the toggle lever type adapted for use on aircraft and the like.

This application is a division of Harold W. Hults' copending application Serial No. 647,518, filed March 21, 1957. This copending application is now Patent No. 3,035,134, dated May 15, 1962.

An object of the invention is to provide an improved electric switch.

Another object of the invention is to provide improved sealing means for actuator openings in switch casings which is long lived, low cost and highly effective over wide temperature and pressure ranges without significant change in the operating force required to actuate the switch.

Another object of the invention is to provide improved sealing means for actuator openings in switch housings affording effective sealing and minimum force counteracting movement of the actuator.

Another object of the invention is to provide improved means for sealing the base and housing of an electric switch to afford a tight joint despite dimensional variations of the mating parts.

A further object of the invention is to provide improved means for completely sealing an electric switch of the toggle lever type.

The means for sealing the actuator opening in the switch housing includes a molded elastic sealing member of substantially cylindrical shape having substantially U-shaped vertical cross section which permits actuation of the switch with minimum force.

The means for sealing the base and housing includes an elastic sealing member compressed between a ridge of one of the mating parts and the other mating part to allow flow of the sealing member along the sides of the ridge when the parts are assembled.

Other objects and advantages will be pointed out in, or be apparent from the specification and claims, as will obvious modifications of the several embodiments shown in the drawings, in which:

FIG. 6 is a horizontal sectional view on the line 6—6 of FIG. 1;

FIG. 7 is a vertical sectional view on the line 7—7 of FIG. 4;

FIG. 8 is a horizontal sectional view on the line 8—8 of FIG. 1;

FIG. 9 is a bottom plan view of the actuator block shown in FIG. 1;

FIG. 10 is a longitudinal, vertical sectional view of one modification of the switch shown in FIG. 1;

FIG. 11 is a horizontal sectional view on the line 11—11 of FIG. 10;

FIG. 12 is a view similar to FIGS. 6 and 11 but showing a modified driving plate and firing spring arrangement;

FIG. 13 is a vertical sectional view similar to FIG. 7 but with the modified driving plate, firing springs and actuator block shown in FIG. 10;

FIG. 14 is a bottom plan view of the modified actuator block shown in FIG. 10;

FIG. 15 is a side elevation view of the switch;

FIG. 19 is a fragmentary sectional view similar to FIG. 1 but with a modified actuator block with no driving plate or firing springs.

Figure 1:
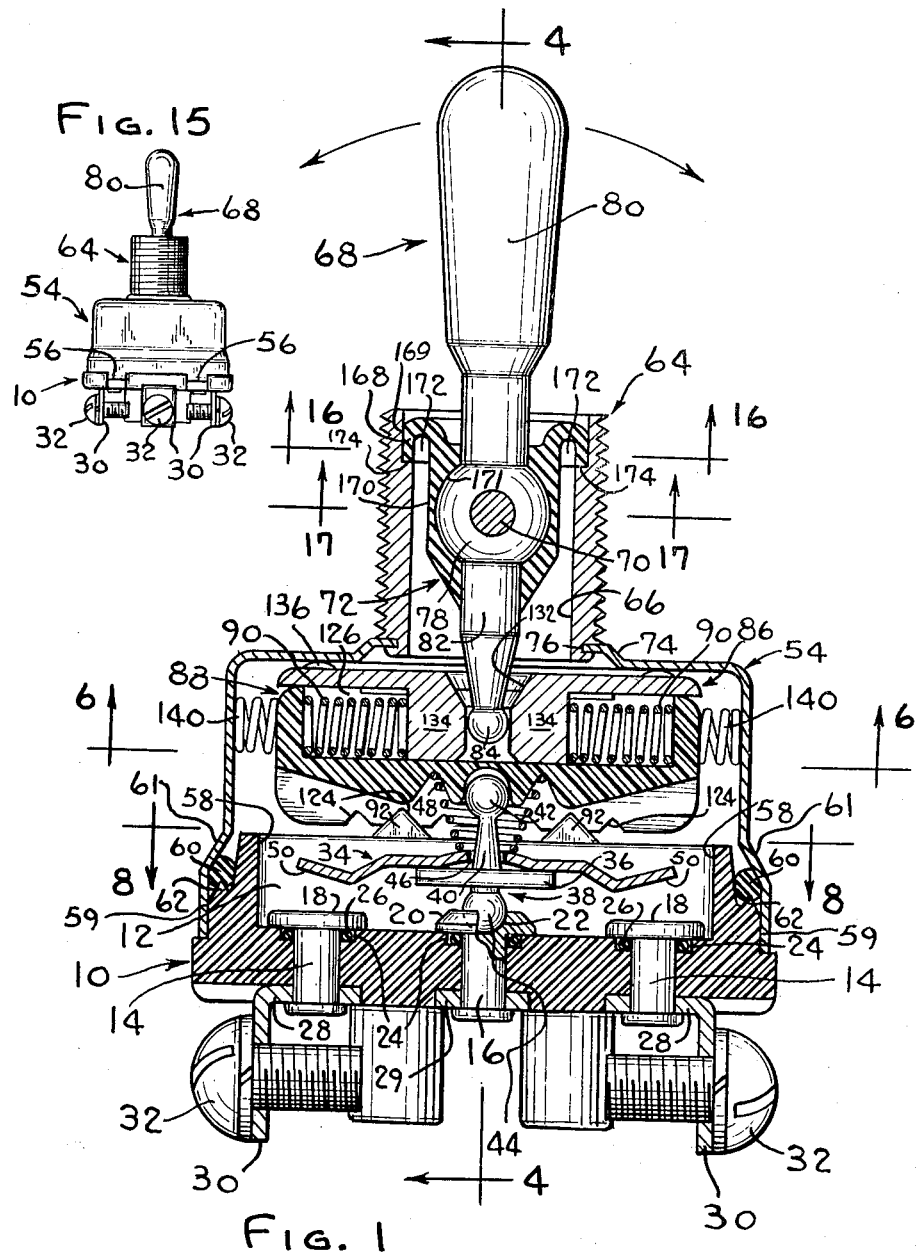
FIGURE 1 is a longitudinal, vertical sectional view of a single pole, double-throw switch in the Off position constructed in accordance with my invention, the section being taken on line 1—1 of FIG. 4.

Referring first to the switch shown in FIGS. 1, 2, 3, 4, 6 and 7, the numeral 10 designates a supporting base molded from a suitable insulating material. Base 10 is of substantially rectangular contour provided with an upwardly opening substantially rectangular recess 12. Recess 12 is provided in its bottom wall with three aligned openings to accommodate the shanks of two outer contact rivets 14 and a middle common terminal rivet 16. The heads 18 of rivets 14 form the stationary contacts of the switch and are preferably formed of fine silver, or of a similar metal having good electrical conductivity and low contact resistance. The head 20 of common terminal rivet 16 has a recess 22 of spherical contour to accommodate the driver element of the switch as hereinafter more fully described. Head 20 is also formed of a material having good electrical conductivity and low contact resistance. Surrounding each of the openings in the bottom wall of the recess 12 is a countersink 24 to accommodate elastic sealing members 26, preferably of silicone rubber to hermetically seal the openings into recess 12.

The shanks and rivets 14 and 16 are upset over the flat portions of a corresponding number of terminal members 28 and 29, respectively, secured to the lower surface of base 10. Portions 30 of terminal members 28 and 29 extend downwardly at right angles to their respective flat portions and are tapped to receive the shanks of binding screws 32.

The switch mechanism comprises a rocking type bridging contactor 34 carried on a shoulder 36 of a driver element 38. The contactor and driver element are preferably formed of fine silver, or of a similar metal having good electrical conductivity and low contact resistance. Driver element 38 comprises a portion 40 of circular cross-section which tapers upwardly from shoulder 36 and terminates at spherical end portion 42 and a portion extending below the shoulder which terminates in a spherical end portion 44 resting in recess 22 in head 20 of common terminal rivet 16. The tapered portion 40 of the driver element extends through an opening 46 in contactor 34 which is held firmly on shoulder 36 under the bias of tapered spring 48.

Figure 2:
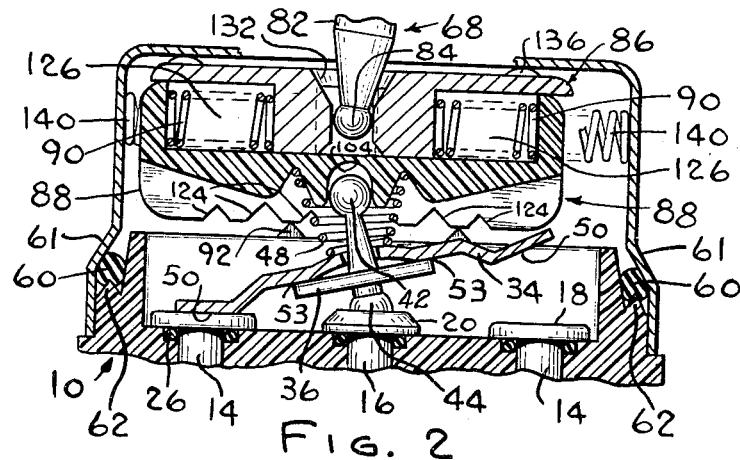
FIG. 2 is a fragmentary view of the switch mechanism shown in FIG. 1 with the switch in an intermediate position between On position (FIG. 3) and fully open or Off position (FIG. 1)
Figure 3:
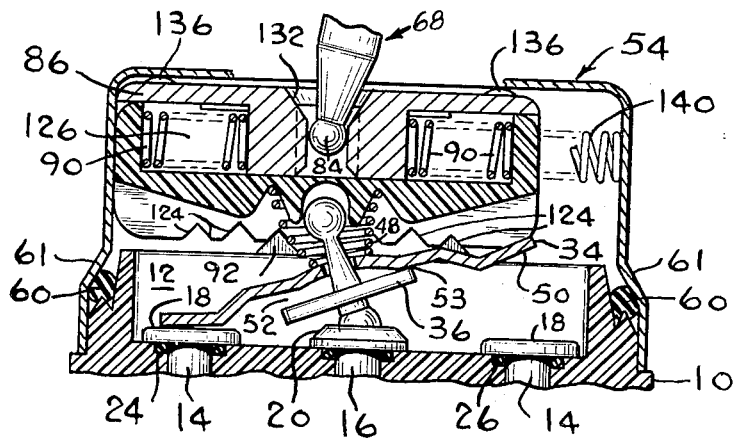
FIG. 3 is a fragmentary view of the switch mechanism shown in FIG. 1 with the switch in the fully closed or On position.

Having thus described the structure of the switch mechanism I will now describe its operation which must be understood to appreciate some of the important aspects of my invention. Reference is made to FIG. 1 which shows the switch in the center or Off position; FIG. 3 which shows the switch in a completely closed or On position; and FIG. 2 which shows the switch in an intermediate instantaneous position between closed and open positions.

In the On position (FIG. 3) a closed circuit from one outer terminal member 28 through a contact rivet 14, contactor 34, driver element 38, common terminal rivet 16 and center terminal 29 can be traced. This circuit is opened by pivoting driver element 38 to the right to move a flat end portion 50 of contactor 34 out of contact with head 18 of contact rivet 14. FIG. 2 shows the contactor as the flat end portion 50 at the left-hand end of contactor 34 is about to break contact with head 18 of the left-hand contact rivet 14. Flat end portion 50 is angled upwardly from the central portion of the contactor so that upon contact break there is a maximum area of contact at the instant when arcing is most likely to occur. Movement of the driver element from the position shown in FIG. 3 to that shown in FIG. 2 will cause the right-hand edge of tapered portion 40 to pivot the contactor on fulcrum 53 and slide the flat portion 50 of the contactor on contact 18. The taper of portion 40 insures against binding of the contactor on the driver element. This feature is of particular importance as the portion 50 slides into the On position. There is a slight pivotal movement of the contactor on the stationary contact which slightly increases the area of contact as the contactor moves from the position shown in FIG. 3 to that shown in FIG. 2.

The positive shear force acting at the contact surface serves to very effectively break the contacts if welded together and also to wipe the contacts and keep them free of dust and products of oxidation and thereby reduce contact resistance. This reduction in contact resistance makes it possible in some circumstances to use contacts made from non-rare metals such as copper, bronze, and the like, instead of contacts made from rare metals such as silver, platinum, and the like.

It is important to note that sliding action follows immediately after initial contact (as well as before contact break) when welding is most likely to occur to provide a shear force when the weld is still hot and can be broken most easily.

As the switch moves into the On position, as shown in FIG. 3, the contactor pivots on fulcrum 53 causing the left-hand portion of shoulder 36 to become separated from the contactor leaving a space 52 between the two parts to automatically compensate for contact wear. As wear occurs at the contacts the space 52 will be correspondingly reduced.

A stamped sheet metal housing member 54 of substantially inverted cup-shape, and of substantially rectangular contour to conform to the shape of base 10 is secured to the base by means of integral tabs 56 (FIG. 15) extending from the lower edge of housing member 54 and bent to engage downwardly facing shoulders formed in the sides of base 10. An elastic sealing member 60, preferably of silicone rubber, is compressed between a ridge 62 extending around the perimeter of the base and the wall of the housing member to tightly and to hermetically seal the joint between the base and the housing member. Ridge 62 is formed between side walls 58 and 59 of the base to compress member 60 between the ridge, wall 58 and offset shoulder portion 61 in the wall of housing member 54. The space on either side of the ridge allows for deformation of member 60 to compensate for variations in the vertical and horizontal dimensions of the base and housing member to thereby insure a tight seal without requiring parts made to very close tolerances.

The mounting bushing and operating mechanism for the switch includes an externally threaded sleeve or bushing 64 having an axial opening 66 therethrough, an operating lever 68 which is preferably formed of metal, a pivot member 70 for the operating lever 68 and a hermetic sealing member 72 hereinafter more fully described. The upper central portion 74 of the housing member 54 is offset vertically from the top and is provided with an opening 76. The lower end of bushing 64 has a reduced outside diameter and extends through opening 76. The relatively thin extreme lower end portion of bushing 64 is upset radially outwardly or riveted over the lower surface of portion 74 to effect a rigid and non-rotatable connection between the bushing 64 and the housing 54. The operating lever 68 consists of a somewhat enlarged, generally spherical portion 78 disposed within axial opening 66 of bushing 64, and an operating handle portion 80 formed integrally with and extending upwardly from spherical portion 78 and outwardly beyond the bushing, and an integral shank portion 82 which extends downwardly from spherical portion 78 through opening 76 and tapers to a generally spherical portion 84 at the end of the lever. The headed pivot pin 70 penetrates openings in the walls of the bushing 64 and extends through the center of spherical portion 78 of lever 68 in a direction to provide for pivotal movement of the lever substantially in the plane of movement of driver element 38.

The operating mechanism for providing a snap action in the switch is disposed in housing member 54 between spherical portion 42 at the upper end of driver element 38 and spherical portion 84 at the lower end of lever 68 and includes a driving plate 86, actuator block 88, firing spring 90 and spring-loaded plungers 92.

Figures 4, 5:
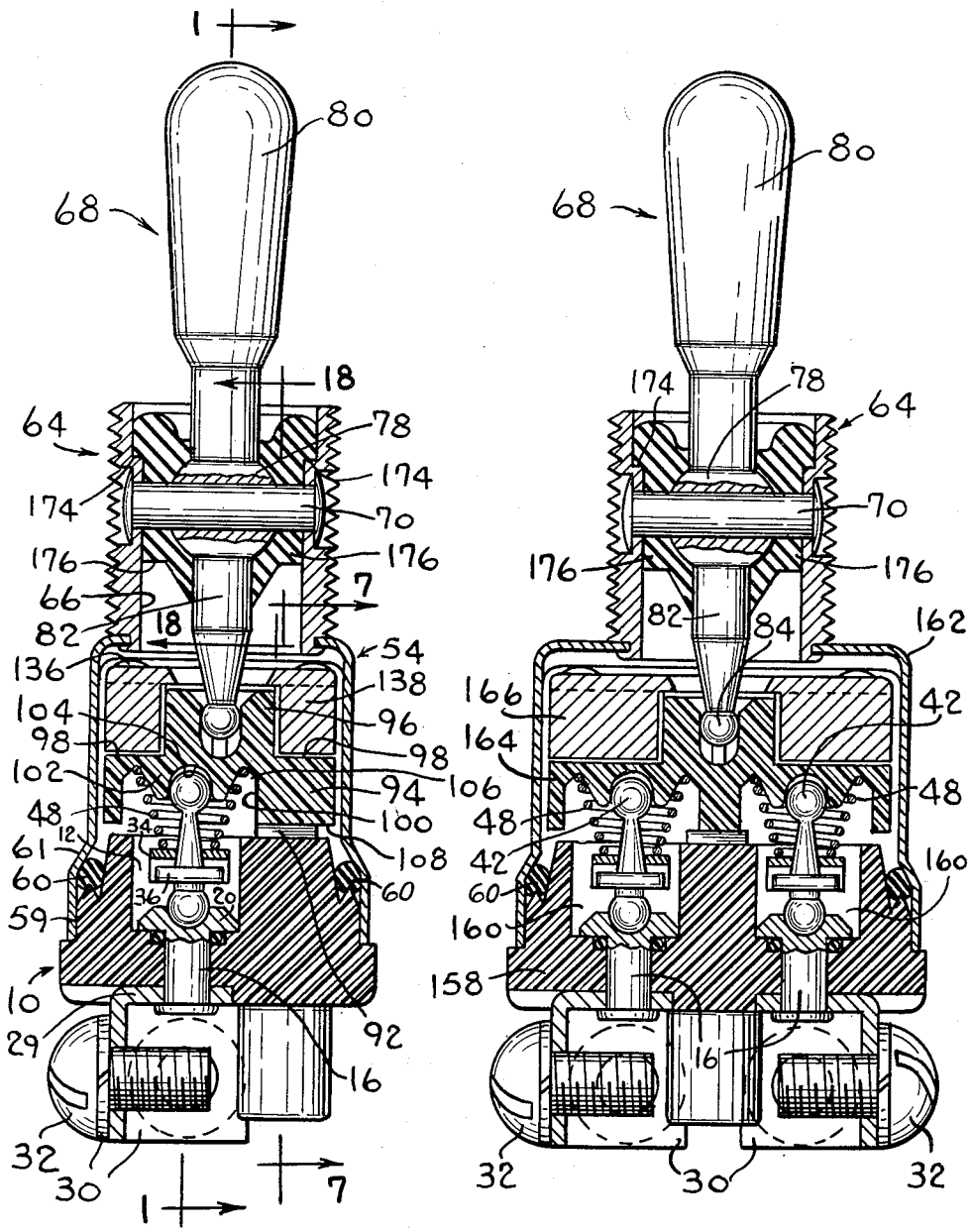
FIG. 4 is a vertical sectional view on the line 4—4 of FIG. 1.
FIG. 5 is a view similar to FIG. 4 but of a two-pole embodiment of the switch.

Referring to FIGS. 1, 2, 4, 7 and 9, actuator block 88, of insulating material, has a substantially rectangular shape with a lower portion 94 and an upper portion 96 of reduced width extending from the lower portion centrally thereof to form shoulders 98 along the top of lower portion 94 (FIG. 4). Lower portion 94 of the block has a groove 100 (FIG. 4) in the lower surface running the length of the block slightly off center from the longitudinal center line of the block. As most clearly shown in FIG. 1 the base or bottom surface of groove 100 slopes downwardly lengthwise toward the middle of the groove from both ends where at the middle is formed a circular plateau portion 102, FIG. 4, with a recess 104 of spherical contour at its center to engage spherical portion 42 of driver element 38. A circular groove 106 around the base of plateau 102 provides a seat for the upper end of spring 48.

Positioned below the notched lower surface 108 of actuator block 88 (FIGS. 7 and 8) are a pair of plungers 92 slidably mounted for reciprocal movement in upwardly opening substantially square-shaped recesses 112 in the base 10. Plungers 92 are molded from a suitable insulating material and have a substantially square cross-section tapered to form ridges 114 at their upper ends. Tongues 116 extend from opposite sides of the plungers for engagement with grooves 118 in the walls of recesses 112 to guide the plungers and prevent binding thereof in the recesses. The plungers are biased upwardly by coiled compression springs 120 mounted in circular recesses 122 in the bottom of recesses 112 to provide continuous engagement of the plungers with grooved surface 108, FIG. 9, on the bottom of actuator block 88.

Actuator block 88 is slidably mounted for straight line reciprocal movement perpendicular to the straight line reciprocal movement of the plungers and in the plane of movement of driver element 38 and operating lever 68. There are six spaced parallel notches 124, FIG. 9, of equal depth and size in surface 108 of the block alternately engaged by spring loaded plungers 92 as actuator block 88 is moved from one position to another. As the actuator block is moved from one position to another, plungers 92 are depressed by the sides of notches 124 compressing springs 120 until ridges 114 on the plungers contact the surface between adjacent notches and will, after slight further movement, snap into the adjacent notches causing contactor 34 to move with a snap action. The sliding movement of block 88 is transmitted to contactor 34 by the engagement of spherical portion 42 on the driver element 38 in recess 104 in the bottom of the actuator block 88.

FIG. 19 shows a modified actuator block 89 with notches 125 spaced immediately adjacent each other without flat surfaces between adjacent notches as is the case with actuator block 88. The use of block 89 provides a slower acting switch, thus affording a slower acting make and break function. This structure does not require the driving plate and firing springs whereby a more economical structure is attained.

This arrangement of an actuator block with notches of desirable depth adapted for engagement by spring loaded plungers mounted for straight line reciprocal movement substantially perpendicular to the straight line reciprocal movement of the block provides a snap action with a positive feel and uniform actuation force. This type of snap action is of particular importance in switches used in aircraft applications where a switch must often be operated without actually observing the switch.

To provide a snap action unimpeded and unrestrainable by the operating lever it is preferable that actuator block 88 be actuated by operating lever 68 through a lost motion connection which includes means for preloading the actuator block as the lost motion is taken up to provide a source of potential energy to supplement the snap action force provided by the actuator block and spring loaded plunger arrangement described above. This lost motion connection and preloading mechanism includes driving plate 86 slidably mounted on the top surface of upper portion 96 of actuator block 88 and biased against relative sliding movement with respect to the actuator block by firing springs 90. Firing springs 90 are mounted in rectangularly shaped recesses 126 (FIG. 6) in upper portion 96 of the actuator block. At the center of upper portion 96 is a recess 128 (FIG. 12) with substantially spherical-shaped end walls. Connecting slots 130 extend between the recesses 126 and the ends of recess 128. Driving plate 86 is of rectangular-shape with a central opening 132 to allow the passage of spherical end 84 of lever 68 therethrough for accommodation in recess 128 in the actuator block. Lugs 134 project downwardly from the bottom surface of the driving plate at opposite edges of opening 132 into slots 130 in the actuator block and are disposed between one end of firing springs 90 and the spherical portion 84 at the end of lever 68. As lever 68 (FIG. 6) is pivoted the spherical end 84 will contact one or the other of lugs 134 on the driving plate 86 to slide the plate relative to the actuator block until contact is made between the end of the lever and the walls of central recess 128 in the actuator block 88, whereafter further movement of the lever will move the block and driving plate as a unit. As this lost motion between the lever and block is taken up, one or the other of the firing spings 90 will be compressed by the restraining action of the horizontal force component produced by plunger springs 120. A source of potential energy is provided to accelerate actuator block 88 between such restraining action and the accelerator action of the spring loaded plungers 92. Because firing springs 90 are compressed before the plungers 92 are forced from notches 124 it is impossible to hold the switch at the dead-center or zero contact pressure position. As shown in FIG. 2, plungers 92 have been depressed and block 88 is moving with the flat surfaces between notches 124 in contact with ridges 114 of the plungers. The right-hand firing spring 90 is still slightly compressed and has not yet completely expended its stored energy as indicated by the slight off-center position of driving plate 86 on actuator block 88. Firing springs 90 accelerate the block from the time plungers 92 are forced from notches 124 until the plungers engage adjacent notches at which time the plungers take over and continue the acceleration of the block to thereby insure a snap action at the instant of contact make and break. The driving plate 86 is bumped upward at four points 136 on its upper surface to reduce friction between the plate and the housing member 54 when the switch is actuated.

For "momentary contact" type of switch operation, lugs 138 (FIG. 6) which project downwardly from the lower surface of driving plate 86 and return springs 140 are provided. Springs 140 are positioned on shoulders 98, FIG. 4, on actuator block 88 between lugs 138 and housing member 54. The four-spring arrangement shown in FIG. 6 provides a Momentary On-Off-Momentary-On operation. Removing the return springs from either side of the driving plate provides an On-Off-Momentary-On or a Momentary-On-Off-On operation. Removal of all the return springs results in an On-Off-On operation. Further modifications can be made by eliminating one or the other of the stationary contact rivets 14.

As shown in FIGS. 10, 11, 13, and 14, if a two (without center off) instead of a three position switch is required a slightly modified actuator block 142, driving plate 144, return springs 146 and contactor 148 are used without changing any of the other parts of the switch previously described. Actuator block 142 (FIGS. 13 and 14) has four notches 150 so spaced on the under surface thereof to position the switch as shown in FIG. 10 and alternately with the right-hand end of contactor 148 in contact with right-hand contact rivet 14 with no intermediate center position. Contactor 148 (FIG. 10) is of slightly different configuration than contactor 34 to provide a two-position switch having no center Off position. A driving plate 144 (FIG. 11) is provided with downwardly projecting lugs 152 located at one end of the plate with elongated return springs 146 positioned on shoulder 98 of the actuator block between lugs 152 and housing member 54 to provide "momentary contact" operation in the two-position switch. An Off position can be provided by eliminating either one of the stationary contacts 14. The insulating base 10 is molded with only partial openings therethrough which are punched completely through when a contact rivet 14 is installed, thus eliminating plugging of the hole when a contact rivet is not required.

A still further modification is provided by a driving plate 154 (FIG. 12) used with the three-position actuator block 88 and contactor 36 to give an On-Momentary Off-None operation. Driving plate 154 has an elongated lug 156 (FIG. 12) projecting off-center from the underside of the plate with return springs 140 positioned on shoulder 98 of block 88 between lugs 156 and housing member 54. FIG. 12 shows the actuator block 88 in the On position from which it can be moved to a Momentary Off position at the center but can be moved no further because springs 140 are completely compressed before the third position is reached.

FIG. 5 shows a multi-pole embodiment of the switch wherein an insulating base 158 having two recesses 160 and centrally mounted plungers, a larger housing member 162, a modified actuator block 164, and a modified driving plate 166 are utilized to operate two contact assemblies of identical structure and operation as that of the single-pole embodiment.

Figures 16, 17, 18:
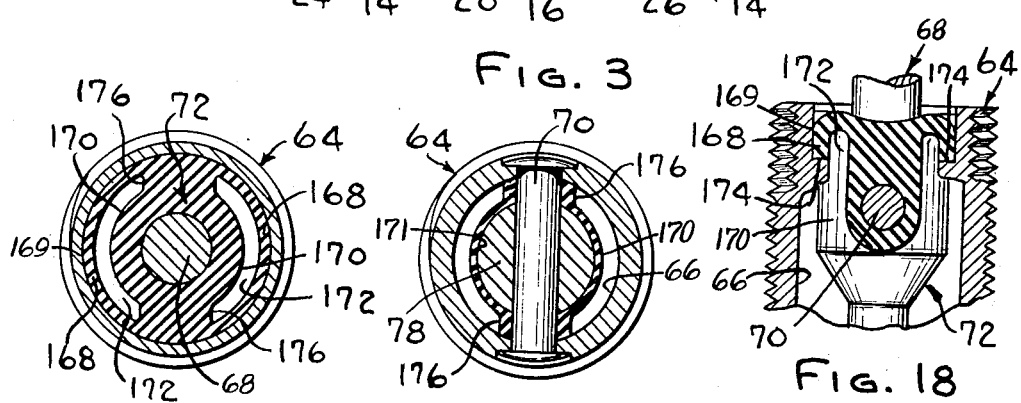
FIG. 16 is a horizontal sectional view taken on line 16—16 of FIG. 1.
FIG. 17 is a horizontal sectional view taken on line 17—17 of FIG. 1.
FIG. 18 is a vertical sectional view taken on line 18—18 of FIG. 4.

Referring now to FIGS. 1, 4, 16, 17 and 18, the sealing member 72 is composed of an elastic rubber-like material preferably silicone rubber, which for best results is molded in place between bushing 64 and spherical portion 78 of lever 68 after the lever has been pivotally mounted on pin 70 in the bushing. It is substantially circular or cylindrical and has an axial opening therethrough. As shown in FIG. 1, sealing member 72 has a substantially U-shaped cross-section through opposite sides thereof transversely of pin 70 with an outer depending leg portion 168 having an outer peripheral surface 169 sealed to bushing 64 and an inner leg portion 170 having an inner substantially cylindrical surface 171 sealed to lever 68 with a space 172 between the two legs. The lower end of outer leg portion 168 rests on a shoulder 174 formed by the area of increased inside diameter at the top of the bushing, and inner leg 170 is sealed to lever 68 at spherical portion 78. As shown in FIGS. 16, 17 and 18, the space 172 between the outer leg 168 and inner leg 170 does not extend entirely around the circumference of the inner leg but is filled up with portions 176 at the two points where pin 70 passes through the bushing to seal the opening in the bushing through which the pin passes. As the switch is actuated, for example, from the position shown in FIG. 1 to that shown in FIG. 3, the portion of relatively small cross-sectional area between legs 168 and 170 on one side of sealing member 72 is stretched slightly while on the other side of the member 72 the movement of the lever pushes the inner leg into space 172 closely adjacent leg 168 as shown in FIG. 10. Only a very small force is expended in either stretching or compressing the sealing member during this movement resulting in lower forces required to actuate the switch.

Although one embodiment of the present invention has been illustrated and described, it will be apparent to those skilled in the art that various changes and modifications may be made therein without departing from the scope of the appended claims.

I claim:
1. In combination with a toggle switch having a hollow casing for accommodating the switch mechanism, a tubular sleeve secured at one end thereof to an aperture in said casing and having a central through-bore communicating with the interior of said casing, a toggle lever extending through said sleeve bore and having an intermediate enlarged substantially spherical portion integral therewith, and a pivot pin extending through opposed holes in said sleeve and through a transverse hole in said spherical portion for pivoting said lever in said sleeve for limited rocking movement in a plane transverse to said pin, the improvement comprising means for sealing the space between said lever and said sleeve to seal the interior of said casing from the atmosphere, said sealing means comprising a substantially cylindrical elastic sealing member surrounding and in sealing contact with said spherical portion of said lever and having substantially U-shaped cross-sections through opposite sides thereof in said plane transverse to said pin to provide an inner leg portion surrounding and in sealing contact with a portion of said lever and an outer leg portion having its outer peripheral surface in sealing contact with the inner surface of said sleeve, said spherical portion and said pivot pin maintaining said sealing member secured to said lever, and said U-shaped cross-sections of said sealing member affording movement of said lever in said plane with minimum counteracting force.

2. The combination according to claim 1 in which said elastic sealing member is molded in place between the sleeve and lever.

3. The combination according to claim 1 in which the legs of the elastic member extend toward the interior of the casing.

4. The invention defined in claim 1, wherein said elastic sealing member is provided with opposite portions surrounding portions of said pivot pin adjacent the opposite end portions of the latter and completely filling the space between opposite sides of said spherical portion and said sleeve around said pivot pin.

5. The invention defined in claim 1, together with an annular shoulder on the inner surface of said sleeve, and said outer leg portion of said sealing member extending within said sleeve toward said casing with the end of said outer leg portion bearing against said shoulder.

6. In a toggle switch having a hollow casing for accommodating the switch mechanism, a tubular sleeve secured at one end thereof to an aperture in said casing and having a central through-bore communicating with the interior of said casing, a toggle lever extending through said sleeve bore and having an intermediate enlarged portion integral therewith, and a pivot pin extending through alined holes in said sleeve and through a transverse hole in said enlarged portion for pivoting said lever in said sleeve for limited rocking movement in a plane transverse to said pin, the improvement comprising:
(a) means for sealing the space between said lever and said sleeve to seal the interior of said casing from the atmosphere without significantly impeding pivotal movement of said lever, said sealing means comprising:
(b) a substantially tubular elastic sealing member surrounding and in sealing engagement with a portion of said lever including said enlarged portion thereof and said pivot pin;
(c) said sealing member having divided cross-sectional portions at one end thereof which extend to one side of said enlarged portion of said lever, said divided portions being in said plane transverse to said pivot pin and extending away from opposite sides of said plane;
(d) the divided portion on each side of said lever providing an inner leg portion in sealing engagement with said lever and an outer leg portion in sealing engagement with the inner surface of said sleeve;
(e) said enlarged portion and said pivot pin maintaining said sealing member secured to said lever;
(f) and each said divided portion having a space between the inner and outer leg portions which closes when said lever is pivoted in the corresponding direction in said plane to minimize the force counteracting movement of said lever.

References Cited in the file of this patent

UNITED STATES PATENTS

| | | |
|---|---|---|
| 1,702,056 | Murray | Feb. 12, 1929 |
| 2,650,964 | Razdow | Sept. 1, 1953 |
| 2,666,092 | Balzer | Jan. 12, 1954 |
| 2,726,105 | Koenig | Dec. 6, 1955 |
| 2,759,075 | Hults | Aug. 14, 1956 |
| 2,798,127 | Roeser | July 2, 1957 |
| 2,885,905 | Larkin | May 12, 1959 |
| 2,916,592 | Campe | Dec. 8, 1959 |